(12) United States Patent
Lozornio

(10) Patent No.: US 11,892,057 B2
(45) Date of Patent: Feb. 6, 2024

(54) BINDING SYSTEM WITH LOCKING WORK PIECE

(71) Applicant: Marco Antonio Lozornio, Anaheim, CA (US)

(72) Inventor: Marco Antonio Lozornio, Anaheim, CA (US)

( * ) Notice: Subject to any disclaimer, the term of this patent is extended or adjusted under 35 U.S.C. 154(b) by 0 days.

(21) Appl. No.: 17/706,562

(22) Filed: Mar. 28, 2022

(65) Prior Publication Data

US 2022/0290736 A1    Sep. 15, 2022

Related U.S. Application Data

(60) Continuation-in-part of application No. 17/010,651, filed on Sep. 2, 2020, now abandoned, and a
(Continued)

(51) Int. Cl.
*F16G 11/10*     (2006.01)
*F16G 11/14*     (2006.01)
(Continued)

(52) U.S. Cl.
CPC .......... *F16G 11/103* (2013.01); *F16G 11/046* (2013.01); *F16G 11/143* (2013.01); *A41D 13/065* (2013.01); *Y10T 24/3918* (2015.01)

(58) Field of Classification Search
CPC .... F16G 11/103; F16G 11/046; F16G 11/143; A41D 13/065; Y10T 24/314; Y10T 24/316
See application file for complete search history.

(56) References Cited

U.S. PATENT DOCUMENTS

| 192,789 A | 7/1877 | Peteler |
| 760,819 A | 5/1904 | Strunk |
| (Continued) | | |

*Primary Examiner* — Robert Sandy

(57) ABSTRACT

A binding system is provided for attaching a first object to a second object and/or for bundling a plurality of objects. The binding system includes a locking work piece having a first channel and a second channel, the first channel having a channel opening on a first side of the locking work piece, the second channel having a channel opening at an opposite side of the locking work piece. An elastomeric cord has a first end and a second end, and a first cross-sectional dimension when in an unstretched condition, wherein the first channel has a width that is less than the first cross-sectional dimension of the elastomer cord, wherein the elastomer cord may be guided around the second object so that the second end can be connected to the locking work piece by stretching the elastomer cord to reduce the cross-sectional dimension of the elastomer cord to a size smaller than the width of the first channel, inserted into the first channel, and unstretched so that the elastomer cord is retained within the first channel, and wherein the second channel has a width that is less than the first cross-sectional dimension of the elastomer cord, wherein the second end of the elastomer cord that is retained within the first channel can be further stretched to reduce the cross-sectional dimension of the elastomer cord to a size smaller than the width of the second channel, inserted into the second channel, and unstretched so that the elastomer cord is retained within the second channel.

15 Claims, 12 Drawing Sheets

Related U.S. Application Data continuation-in-part of application No. 16/379,788, filed on Apr. 9, 2019, now Pat. No. 11,406,142, said application No. 17/010,651 is a division of application No. 16/365,552, filed on Mar. 26, 2019, now Pat. No. 10,883,570.

(60) Provisional application No. 62/654,530, filed on Apr. 9, 2018.

(51) Int. Cl.
*F16G 11/04* (2006.01)
*A41D 13/06* (2006.01)

(56) References Cited

U.S. PATENT DOCUMENTS

| | | | |
|---|---|---|---|
| 912,566 A | 2/1909 | Heisterkamp | |
| 1,231,309 A | 6/1917 | Stout | |
| 3,267,540 A | 8/1966 | Wolcott | |
| 3,675,276 A | 7/1972 | Nuse | |
| 3,675,279 A | 7/1972 | Nurse | |
| 4,178,661 A * | 12/1979 | Klein | F16G 11/103 24/130 |
| 4,432,121 A * | 2/1984 | Dupre | F16B 45/00 294/82.11 |
| 4,745,663 A | 5/1988 | Crowson | |
| 5,168,605 A * | 12/1992 | Bartlett | F16G 11/143 24/519 |
| 5,205,687 A | 4/1993 | Boyland | |
| 5,210,912 A | 5/1993 | Hoefkes | |
| 5,625,925 A * | 5/1997 | Richards | F16G 11/14 24/129 B |
| 5,784,763 A | 7/1998 | Cassidy | |
| 7,140,148 B1 | 11/2006 | Williams, II | |
| 7,636,986 B2 * | 12/2009 | Sorensen | F16G 11/14 24/130 |
| 10,883,570 B1 | 1/2021 | Lozornio | |
| 11,406,142 B1 | 8/2022 | Lozornio | |
| 2005/0257348 A1 | 11/2005 | Byers | |
| 2008/0195013 A1 | 8/2008 | Ingimundarson | |
| 2010/0160957 A1 | 6/2010 | Kirkham | |
| 2010/0275757 A1 * | 11/2010 | Hallet | A63C 11/025 24/484 |
| 2011/0126382 A1 | 6/2011 | Kirkham | |
| 2014/0007389 A1 | 1/2014 | Leung | |
| 2015/0232211 A1 | 8/2015 | Gamache | |
| 2016/0355121 A1 | 12/2016 | Gertsma | |
| 2018/0132549 A1 | 5/2018 | Pratson | |

* cited by examiner

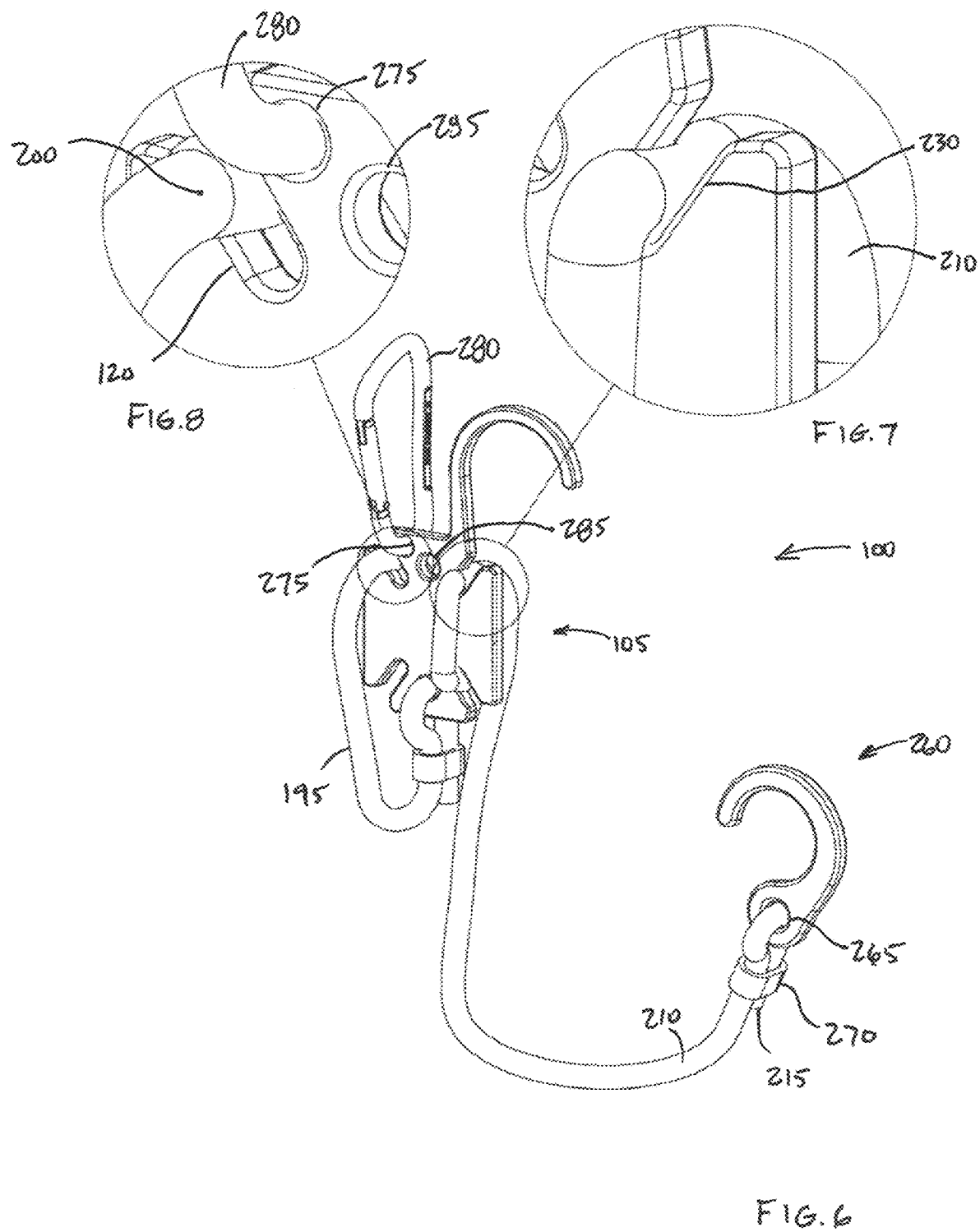

BINDING SYSTEM WITH LOCKING WORK PIECE

PRIORITY

The present application is a Continuation-in-Part of U.S. patent application Ser. No. 17/010,651, filed on Sep. 2, 2020, which is a Divisional of U.S. patent application Ser. No. 16/365,552, filed on Mar. 26, 2019, now U.S. Pat. No. 10,883,570, which claims the benefit of domestic priority based on U.S. Provisional Patent Application 62/654,530, filed on Apr. 9, 2018; the present application is also a Continuation-in-Part of U.S. patent application Ser. No. 16/379,788, filed on Apr. 9, 2019, which claims the benefit of domestic priority based on U.S. Provisional Patent Application 62/654,530, filed on Apr. 9, 2018. All of the aforementioned patents and patent applications are incorporated herein by reference in their entireties.

BACKGROUND

A rope, bungee, or wire is typically used to bind objects together, such as to bundle two or more objects and/or to attach an object to another object. Often, at the last step in a bundling or attaching operation, a person has to call on another person to apply pressure on a point while a knot or clamp is formed or to the junction of rope or the like. While the person is using both hands to stretch the rope or binding material to keep it tight. The assistance of another person enables the operator to hold the ends of the binding material in tension as a knot is formed.

If the person uses a bungee to bind articles or to draw one article toward another with a force to be defined by the person, the bungee selected will have to have an initial length that provides an elastic range of adjustment that meets the requirement of the task. Bungees typically have a hook on each end of the article and use of one or more of the hooks is typically called for. The locking buckle system has hooks as well but use of one or more of the hooks to complete the binding of objects is not required. A knot is not required. The adjustable range of a Bungee without the use of a one or more hooks can be achieved by tying a knot in the two ends as with a rope; however, that process requires the assistance of another to press on the crossing point after the desired tension is obtained and the pressure has to be maintained as a knot is formed.

Use of rope or strap in applications such an adjustment device in clothing, knee pads, construction aprons, school supplies, for workmen, hair piece, in lacing shoes, accessory attachment to a backpack, binding tent poles and other equipment relating to outdoor sports is a short list of examples in which the linking material, such as a rope, a bungee or a strap would require cutting or adjusting with a third hand. The proposed locking buckle system eliminates the need for cutting to obtain an in tension adjustment.

Therefore, there is a need for an improved locking buckle to be used with a binding material such as a bungee.

SUMMARY

The present invention satisfies these needs. In one aspect of the invention, an improved locking buckle to be used with a binding material to bind objects together and/or to attach an object to another object is provided.

It is an object of the present invention to provide a system for binding two or more objects, such as for bundling two or more objects and/or for attaching a first object to another object, such as a knee pad to a leg. In a first embodiment, the present invention includes a locking work piece. The locking work piece has at least a first pair of opposing channels. The channels comprise a first channel and a second channel. The workpiece may have an eyelet. An elastomeric cord is attachable to the work piece, and the elastomeric cord has a first end at the start of an elastomeric cord sequence of portions. The portions will vary in length as required by the application. The portions are enumerated as a first portion, a second portion, a third portion, a fourth compressed portion, and an uncompressed fifth portion. The fifth portion terminates at a second end. In use, the elastomeric cord is attached to the locking work piece.

The second portion of the elastomeric cord is then stretched and wrapped around an object to draw the object toward another object.

The third portion of the elastomeric cord is compressed to pass through the first opposing channel. The first opposing channel has a channel width characterized to compress the elastomeric cord.

The fourth portion of the elastomeric cord is then stretched by the user and forced to pass through the second opposing channel of the locking work piece, after which the elastomeric cord exits the locking work piece to start an uncompressed fifth portion of the elastomeric cord.

The first pair of opposing channels may be formed through the locking work piece on a common central axis.

In another alternative embodiment, a second pair of opposing channels are formed through the locking work piece, in addition to the first pair of channels. The first and second pairs of opposing channels are displaced from each other rotationally on a common rotation axis as they as they penetrate and pass through the locking work piece.

In another object of the invention, an extension of the locking work piece is shaped to form a hook.

In another object of the invention, the locking work piece is used to bind a knee pad to the leg of a user.

In one aspect of the invention, a binding system for attaching a first object to a second object, the binding system comprises a fixing plate connectable to a first side of the first object; a locking work piece connectable to a second side of the first object, the locking work piece comprising a first channel and a second channel, the first channel having a channel opening on a first side of the locking work piece, the second channel having a channel opening at an opposite side of the locking work piece; and an elastomeric cord having a first end and a second end, the first end coupled to the fixing plate, the elastomeric cord having a first cross-sectional dimension when in an unstretched condition, wherein the first channel has a width that is less than the first cross-sectional dimension of the elastomer cord, wherein the elastomer cord may be guided around the second object so that the second end can be connected to the locking work piece by stretching the elastomer cord to reduce the cross-sectional dimension of the elastomer cord to a size smaller than the width of the first channel, inserted into the first channel, and unstretched so that the elastomer cord is retained within the first channel, and wherein the second channel has a width that is less than the first cross-sectional dimension of the elastomer cord, wherein the second end of the elastomer cord that is retained within the first channel can be further stretched to reduce the cross-sectional dimension of the elastomer cord to a size smaller than the width of the second channel, inserted into the second channel, and unstretched so that the elastomer cord is retained within the second channel.

In another aspect of the invention, a binding system for bundling a plurality of objects, the binding system comprises a locking work piece connectable comprising a first channel and a second channel, the first channel having a channel opening on a first side of the locking work piece, the second channel having a channel opening at an opposite side of the locking work piece; and an elastomeric cord having a first end and a second end and a length between the first end and second end sufficiently long to wrap around and bundle the plurality of objects, the first end coupled to the locking work piece, the elastomeric cord having a first cross-sectional dimension when in an unstretched condition, wherein the first channel has a width that is less than the first cross-sectional dimension of the elastomer cord, wherein the elastomer cord may be guided around the second object so that the second end can be connected to the locking work piece by stretching the elastomer cord to reduce the cross-sectional dimension of the elastomer cord to a size smaller than the width of the first channel, inserted into the first channel, and unstretched so that the elastomer cord is retained within the first channel, and wherein the second channel has a width that is less than the first cross-sectional dimension of the elastomer cord, wherein the second end of the elastomer cord that is retained within the first channel can be further stretched to reduce the cross-sectional dimension of the elastomer cord to a size smaller than the width of the second channel, inserted into the second channel, and unstretched so that the elastomer cord is retained within the second channel.

DRAWINGS

These features, aspects, and advantages of the present invention will become better understood with regard to the following description, appended claims, and accompanying drawings which illustrate exemplary features of the invention. However, it is to be understood that each of the features can be used in the invention in general, not merely in the context of the particular drawings, and the invention includes any combination of these features, where:

FIG. 6 is a schematic perspective side of another version of a binding system of the invention;

FIG. 7 is an enlarged view of a portion of the binding system of FIG. 6;

FIG. 8 is an enlarged view of a portion of the binding system of FIG. 6;

DESCRIPTION

This invention relates to a binding system used for wrapping, bailing, bundling, securing, and/or holding items together. The functions listed are typically performed by a person or operator who uses his hands, and in some cases, uses the hands and assistance of another to complete the task. The binding system simplifies the task to one that uses a single person who uses only his or her two hands to achieve a binding of objects that are gripped and held immobile with the binding held in tension adjusted by the person using the binding system.

Figure 1:
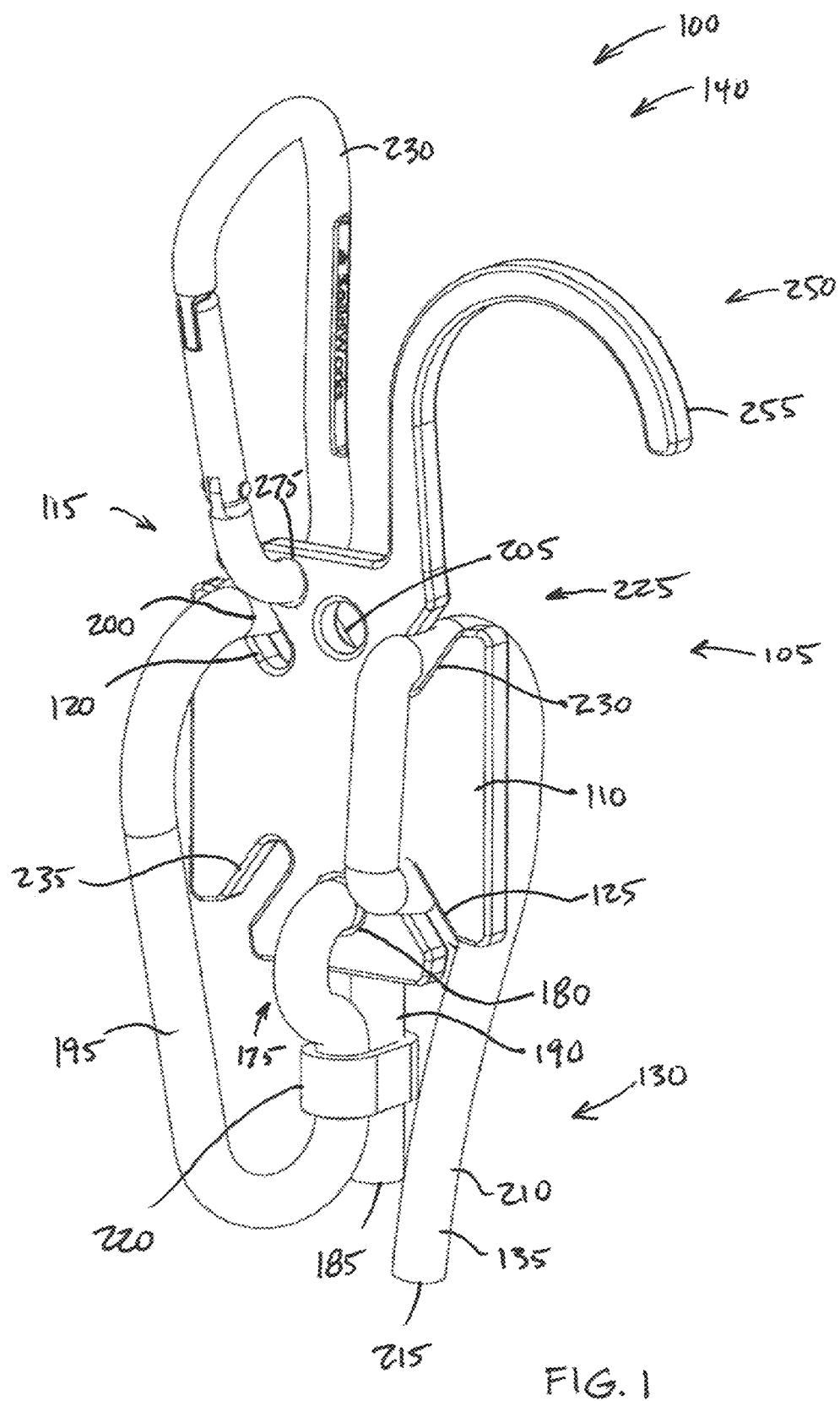
FIG. 1 is a schematic perspective side view of a binding system of the invention.

FIG. 1 shows a version of a binding system 100 of the present invention. The binding system 100 can be used for binding a plurality of objects. By binding a plurality of objects it is meant that the binding system 100 can wrap, bail, bundle, secure, and/or otherwise hold two or more objects together. For example, in one version, the binding system 100 can be used to bundle two or more loose objects together. The loose objects can be the same, similar, or different objects. In another version, the binding system 100 can be used to secure or attach one object to another object, such as by attaching a loose object to a fixed object and/or to a moving object such as a body part. In all versions, the binding system includes a locking work piece 105 having a body 110 that includes at least a pair of channels 115. The body 110 of the locking work piece 105 is a plate or wire, or the like, of rigid material, such as metal or heavy gauge plastic. The pair of channels 115 includes a first channel 120 and a second channel 125 that work together to secure a flexible binding member 130, such as an elastomeric cord 135 or bungee cord, in a manner that binds objects within the flexible binding member 130 as will be described.

Figure 2:
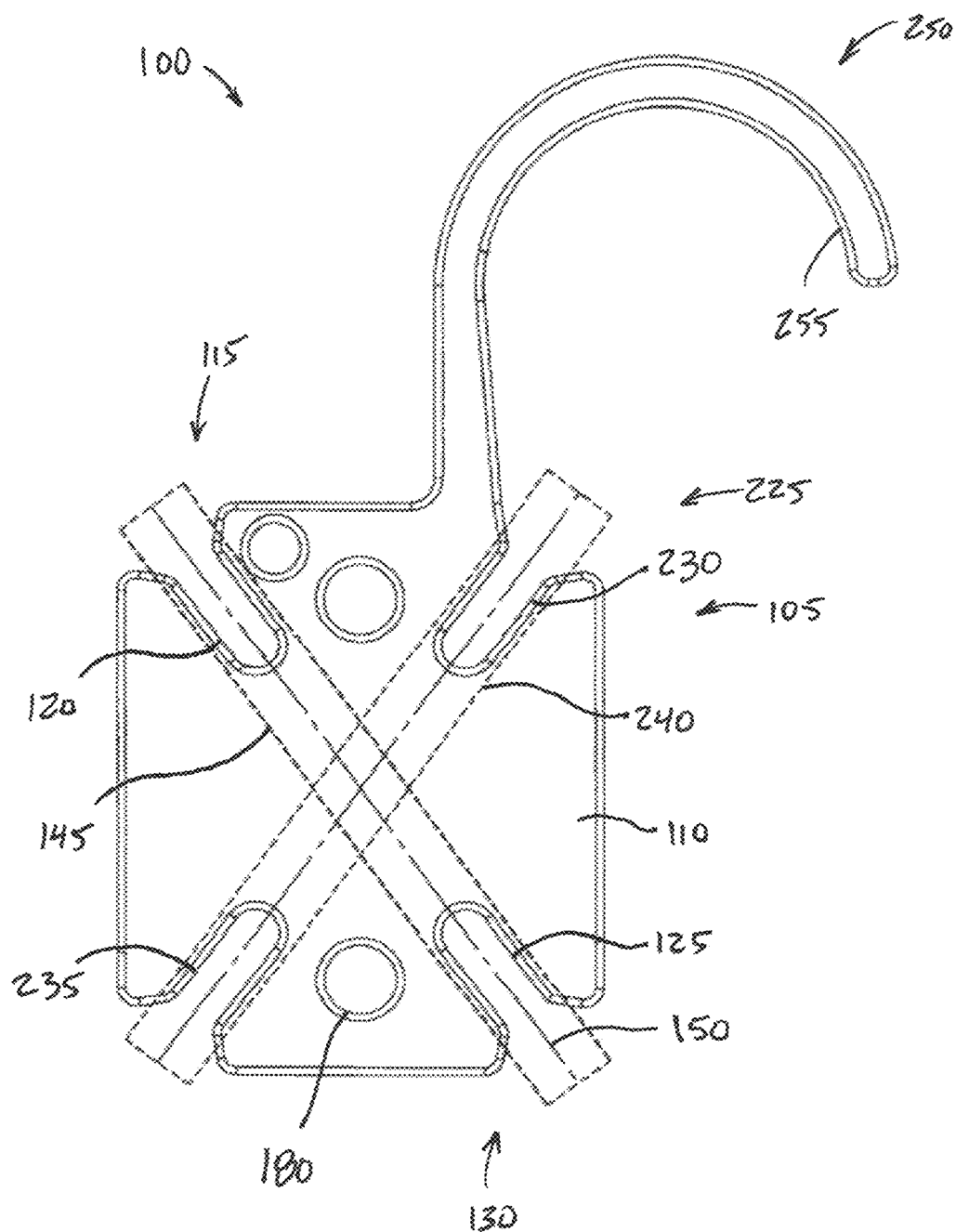
FIG. 2 is a schematic side view of the binding system of FIG. 1.

In the version of FIG. 1, the binding system 100 is a bundling system 140 for bundling a plurality of loose objects. FIG. 2 shows the version of the locking work piece 105 of FIG. 1. The locking work piece 105 of FIGS. 1 and 2 can be fashioned from heavy gauge plastic having a thickness of typically from 0.100 to 0.188 inches or from plate steel. In the version of FIGS. 1 and 2, the locking work piece 105 has a rectangular or polygonal shape. However, the locking work piece 105 may take on any other suitable geometric shape. In the version shown, the first channel 120 and the second channel 125 of the pair of channels 110 are generally diametrically opposed on opposite sides of the locking work piece 105, but they can be otherwise position around the periphery of the locking work piece 105.

Referring now to FIG. 2, by way of example, the drawing shows phantom rectangle 145 containing the pair of channels 115. In the version shown, as discussed above, the pair of channels 115 are opposing channels. In the version shown, the first channel 120 and the second channel 125 are shown as being coaxially aligned on phantom central axis 150. However, the central axis of the first channel 120 and/or the central axis of the second channel 125 may be offset from the central axis 150 by any angle up to 90 degrees, such as at least about or about 0 degrees, at least about or about 10 degrees, at least about or about 20 degrees, at least about or about 30 degrees, at least about or about 40 degrees, at least about or about 50 degrees, at least about or about 60 degrees, at least about or about 70 degrees, at least about or about 80 degrees, or at least about or about 90 degrees. Similarly, the channels are shown as in FIG. 2 as being positions diametrically opposed at diagonally positioned. However, the pair of channels 115 can be any other orientation, such as horizontal and/or vertical or a combination of the orientations.

Figure 3:
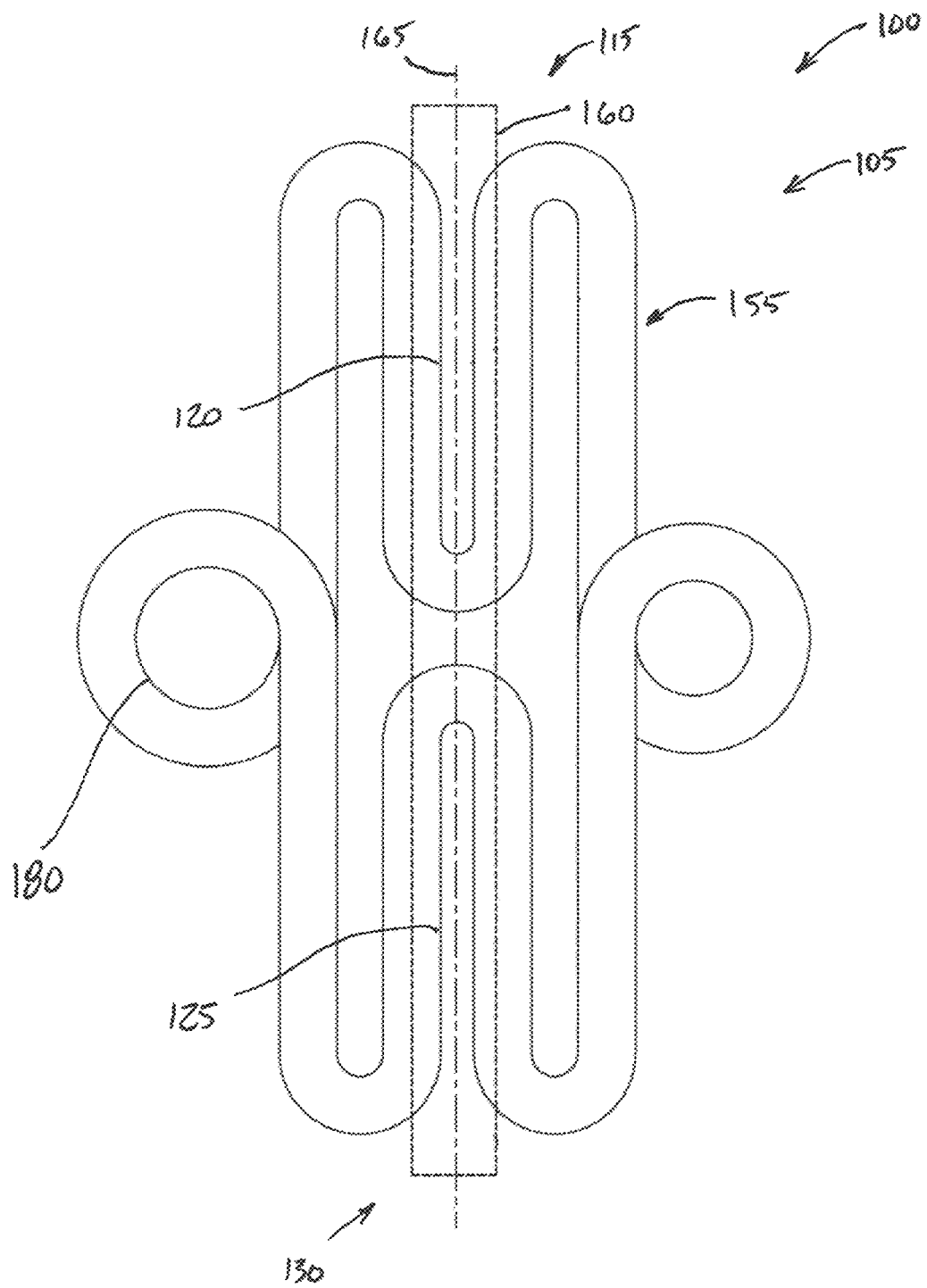
FIG. 3 is a schematic side view of another version of a binding system of the invention.

FIG. 3 shows a version of a locking piece 105 with a body 110 that is fashioned from cold rolled steel 155. Referring to the version of FIG. 3, phantom block 160 is shown the pair of channels 115 of a first channel 120 and a second channel 125 in opposing relationship. The first channel 120 and second channel 125 are shown as being coaxially aligned on phantom central axis 165.

Figure 4:
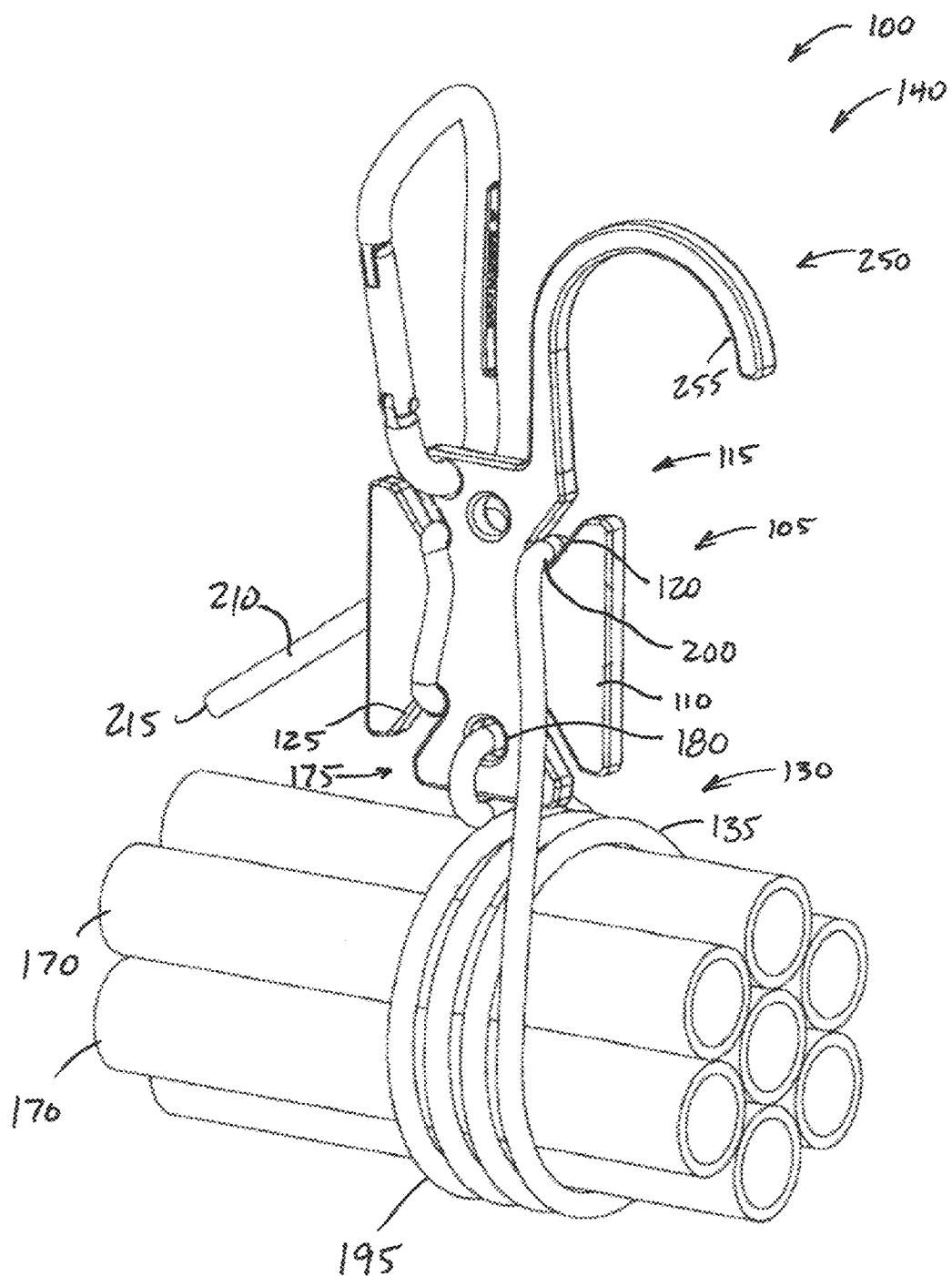
FIG. 4 is a schematic perspective front side view of the binding system of FIG. 1 in use.

The binding system 100 is shown being used as a bundling system 140 in FIG. 4 binding a plurality of objects 170. As can be seen in FIG. 4, when used as a bundling system in the version of FIG. 4, the elastomeric cord 135 is coupled to the work piece 105 by an attachment mechanism 175, such as an attachment mechanism that comprises an eyelet 180. FIGS. 1, 2, and 3 also show the functional equivalent of eyelet 180.

As shown in FIG. 1, the elastomeric cord 130 has a first end 185 followed by a sequence of portions that will be characterized as comprising, a first portion 190, a second portion 195, a third portion 200, a fourth compressed portion 205, and a fifth uncompressed portion 210 terminating at a second end 215.

As shown in FIG. 1, the elastomeric cord 135 first portion 190 passes thru the eyelet 180 and is coupled to the locking work piece 105 to couple the elastomeric cord 135 to the locking work piece 105. As shown in FIG. 1, the coupling can be a clamp 220. However, it is understood that other means can be used for the same function such as a simple knot (not shown) in the portion of the elastomeric cord 135 beyond the eyelet 180, or a staple applied to hold and form the first portion of the elastomeric cord 135 into a loop capturing the eyelet 180. Alternatively still, the elastomeric cord 135 can be attached by an attachment that does not have an eyelet.

Figure 5:
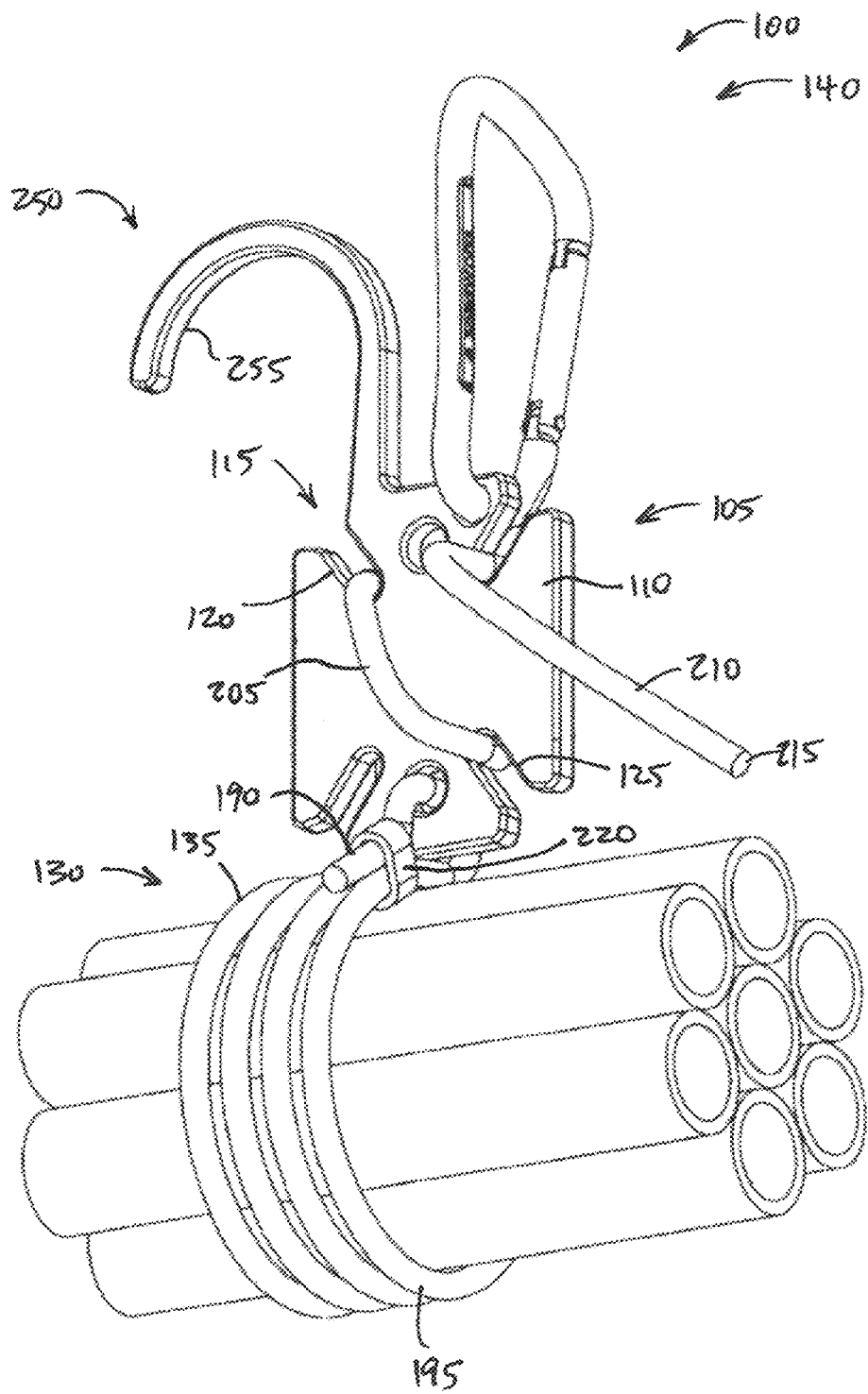
FIG. 5 is a schematic perspective rear side view of the binding system of FIG. 1 in use.

As shown in FIG. 4 and in FIG. 5, which shows a rear view of the system of FIG. 4, the second portion 195 of the elastomeric cord 135 is stretched and wrapped around two or more objects 170, such as those identified as tubular objects to apply a tensile force that draws the objects 170 together. Other objects that could be drawn together include items such as building materials, tools, instruments or even live stock. The objects that can be drawn together and retained in a bundle are as numerous as might be held together by a line or rope. Other objects that might be drawn together include pairs of objects that might require restriction to their separation.

FIG. 4 shows the third portion 200 the elastomeric cord 135 being compressed and passing pass through the first channel 120 of the pair of channels 115. FIGS. 4 and 5 show a channel width that compresses the elastomeric cord 135 by being smaller than the uncompressed width of the elastomeric cord 135. The fourth portion 205 of the elastomeric cord 135 is then stretched and forced to pass through the second channel 125 of the pair of channels 115 ending at the beginning of the uncompressed fifth portion 210.

Optionally, a second pair of channels 225 including a third channel 230 and a fourth channel 235 can be provided. FIG. 2 shows a locking work piece 105 with a second pair of channels 225 within a second phantom box 240 formed through the locking work piece 105 as by stamping or by machining including using a high energy laser. The first pair of channels 115 and the second pair of channels 225 may be symmetrically displaced from each other as they as they penetrate and pass through the work piece.

As shown in FIGS. 1, 2, 4, and 5, in yet another version, the locking work piece 105 can have an extended region 250 that is shaped to form a hook 255 for the convenience of fixing the position of the binding system 100 at the position of the locking work piece 105 by capturing a fixed object with the hook 255.

FIG. 6 shows an embodiment in which an auxiliary hook 260 is attached to the end 215 of the fifth portion 210 of the elastomeric cord 135 second end 50 as it is passed through an auxiliary hook eyelet 265. As shown in FIG. 6, the elastomeric cord 135 passes thru the auxiliary hook eyelet 265 and is coupled to the hook 260 by a clamp 270.

The auxiliary hook 260 can be used to suspend the binding system 100 from a fixed reference frame or, another work piece, or it can be used to engage with hook 255 to provide an adjustable loop that can be drawn into tension without the assistance of a third hand. Auxiliary hook 260 is also used for more easily fixing the position of the binding system 100 at the position of the locking work piece 105 by capturing a fixed object with the hook 255.

FIG. 6 shows yet another alternative embodiment of the locking work piece 105 that has an extended region that is shaped to provide an auxiliary region for an auxiliary eyelet 275. The auxiliary eyelet 275 is provided for receiving a carabineer 280 or the like as also shown in FIG. 1. The locking work piece 105, in some embodiments, has a third eyelet 285 that can be used for storing or receiving the auxiliary hook 260. FIG. 7 and FIG. 8 shows an enlarged views of the compressed elastomeric cord 135 within the channels.

Figure 9:
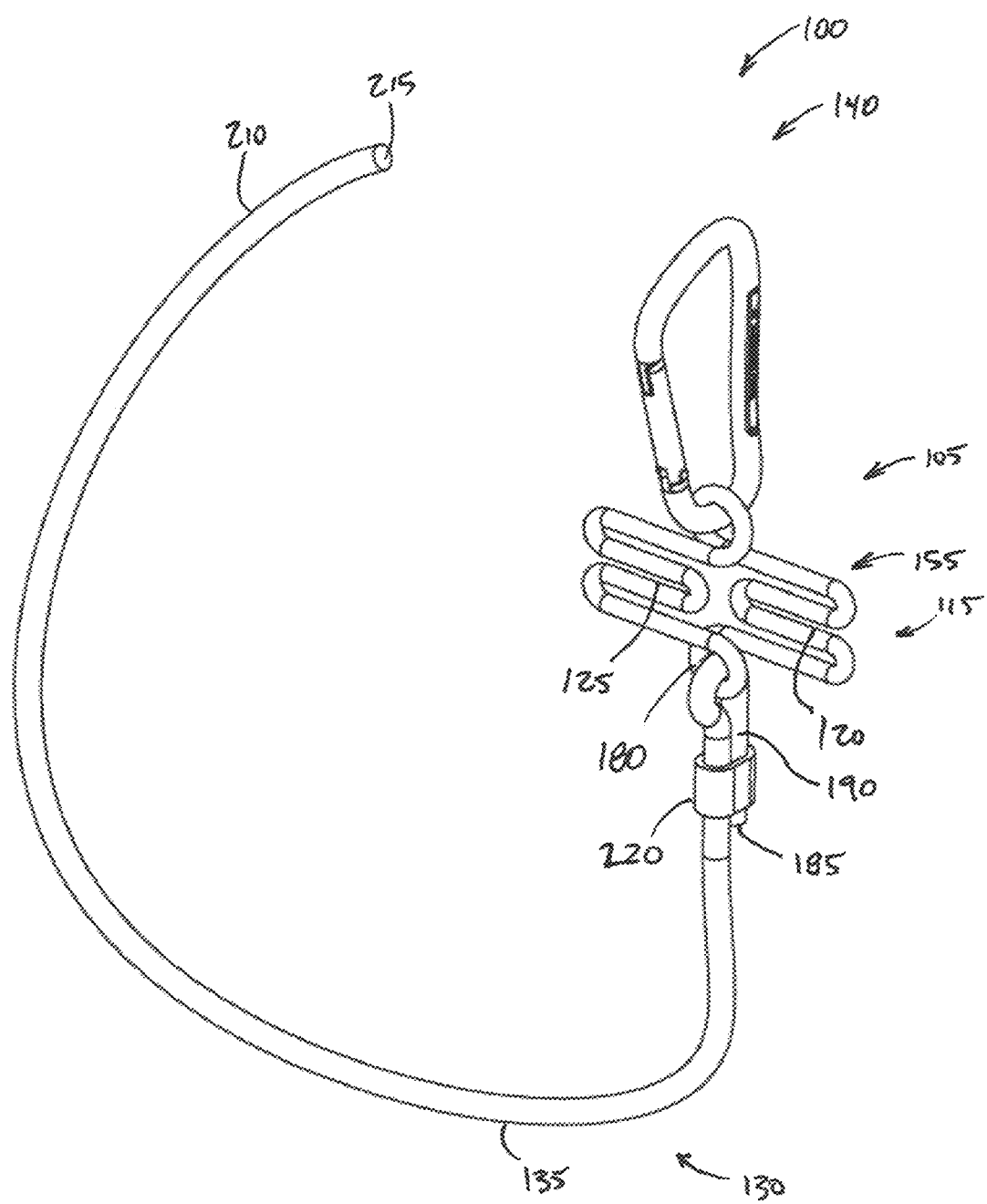
FIG. 9 is a schematic perspective side view of another version of a binding system of the invention.

FIG. 9 shows a version of a binding system 100 using a locking work piece 105 of the type shown in FIG. 3 and with at least a pair of opposing channels.

Figure 10A:
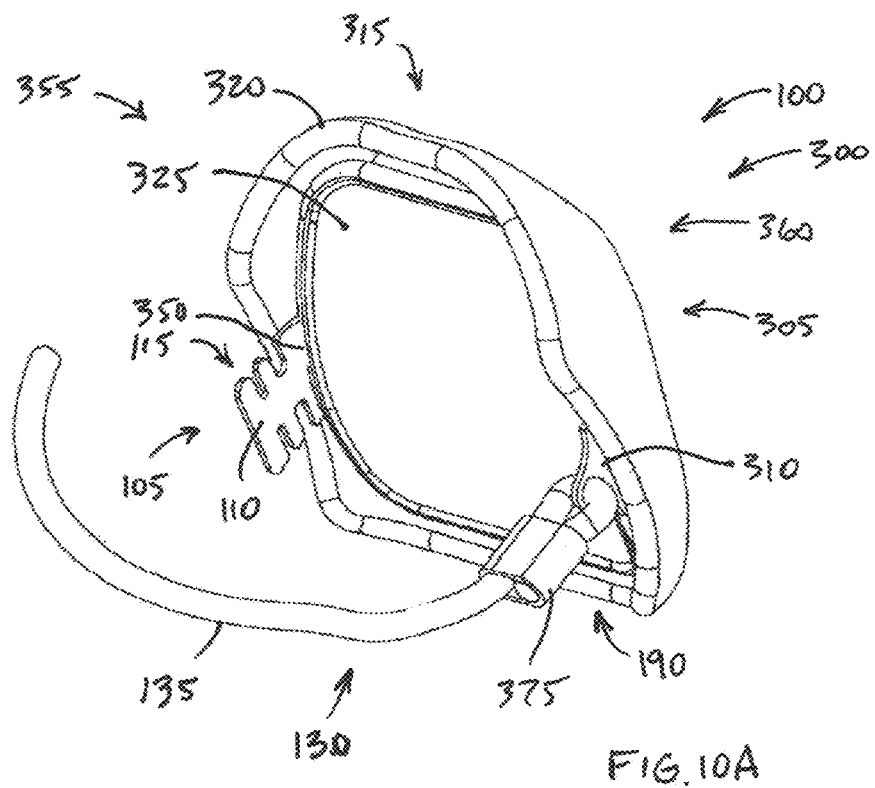
FIG. 10A is a schematic perspective side view of another version of a binding system of the invention for use on a left knee.

FIG. 10A shows a version of a binding system 100 in which the binding system is an attaching system 300 that is used to attach an object 305 to another object, such as a fixed object or a part of a human body. In this version, the locking work piece 105 can be the same as any of the locking work pieces discussed above. However, in this version, the first portion 190 of the elastomeric cord 135 is attached to a fixing plate 310. The locking work piece 105 and the fixing plate 310 are connected to the object 305 that is to be attached to a second object. The elastomeric cord 135 is positioned securely around the second object and secured to the locking work piece 105 so that the object 305 stays attached to the second object.

Figure 10B:
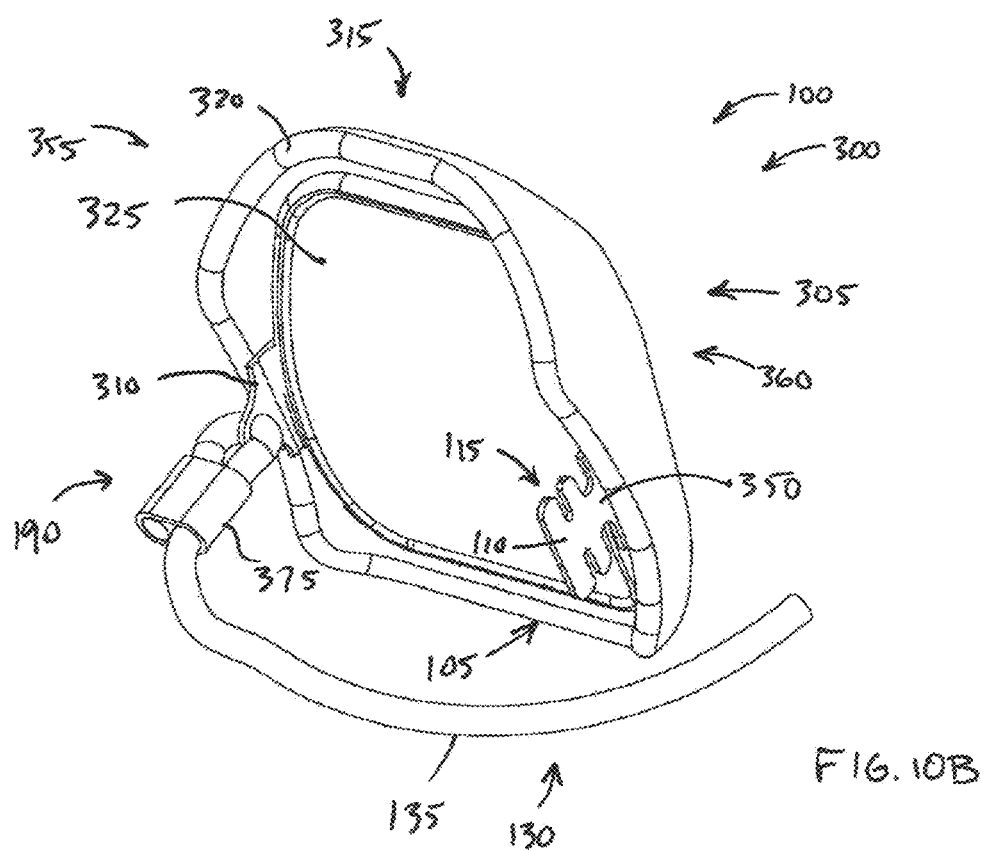
FIG. 10B is a schematic perspective side view of another version of a binding system of the invention for use on a right knee.

In the version of FIG. 10A, the object 305 is a knee pad 315. In the particular version shown, the knee pad is a left knee pad that is adapted to be secured around the left knee of a user. The knee pad 315 has a body 320 that has a convex shape that conforms to the shape of a knee. The body 320 can have padding on one or both sides as is conventionally known. The body 320 includes a structural support 325 within the knee pad body 320. The locking work piece 105 is integrally coupled to the structural support 325. The structural support 325 can be integrally coupled to the knee pad body 320 by bonding, molding, or riveting. Alternatively, the structural support can be homogeneously formed as a composite portion of the knee pad body 320 to provide a location for mooring and mounting the locking work piece 105, as shown in FIG. 10A. FIG. 10B shows a right knee pad. The left knee pad and right knee pad can be provided as a pair or separately.

Figure 11A:
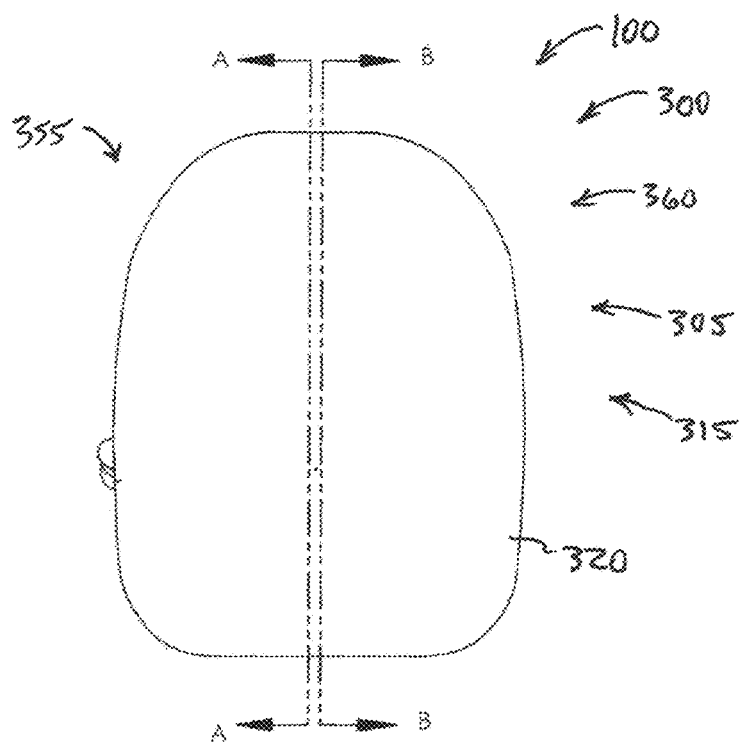
FIG. 11A is a schematic front view of the binding system of FIG. 10A.
Figure 11B:
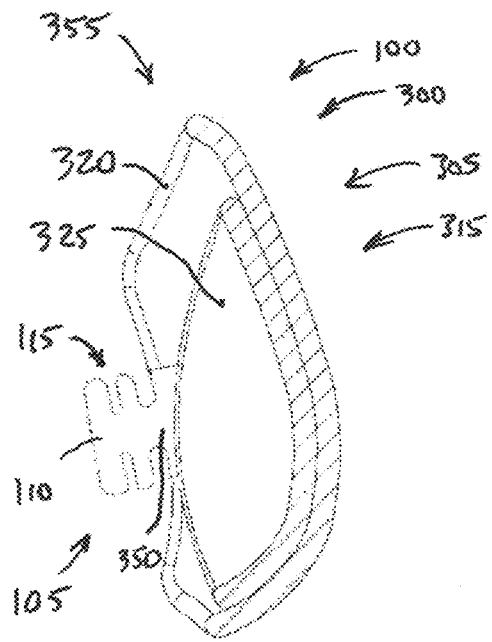
FIG. 11B is a schematic sectional view of the binding system of FIG. 11A along section A-A.
Figure 11C:
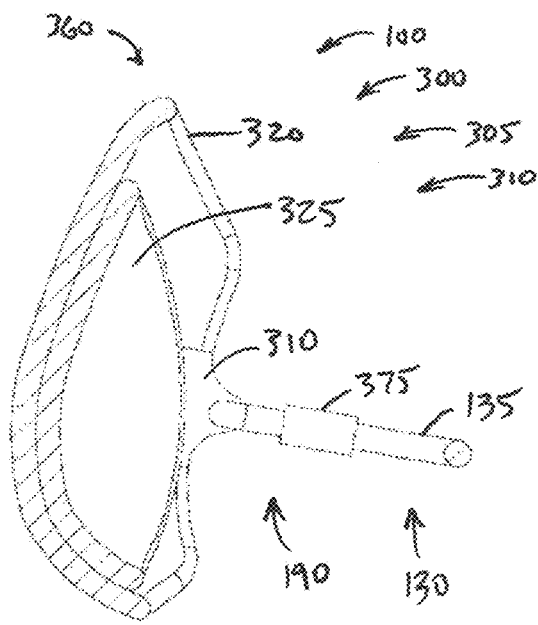
FIG. 11C is a schematic sectional view of the binding system of FIG. 11A along section B-B.

FIGS. 11A, 11B, and 11C are provided to show sectional views of the knee pad 320. FIG. 11B is a right to left section A-A of the sectioned knee pad 320 of FIG. 11A. FIG. 11C is a left to right section B-B of the sectioned knee pad 315 of FIG. 11A. FIGS. 11B and 11C show the structural support 325 providing structural rigidity.

In this version, the locking work piece 110 has an attachment tab region 350 that is connected to the structural support 325. The knee pad 315 has a left side 355 and a right side 360. For the left knee pad of FIG. 10A, the attachment tab region 350 is on the left side 355. For the right knee pad of FIG. 10B, the attachment tab region 350 is on the right side 360. The fixing plate 310 is on the opposite side of the side of the attachment tab region 350.

Figure 12A:
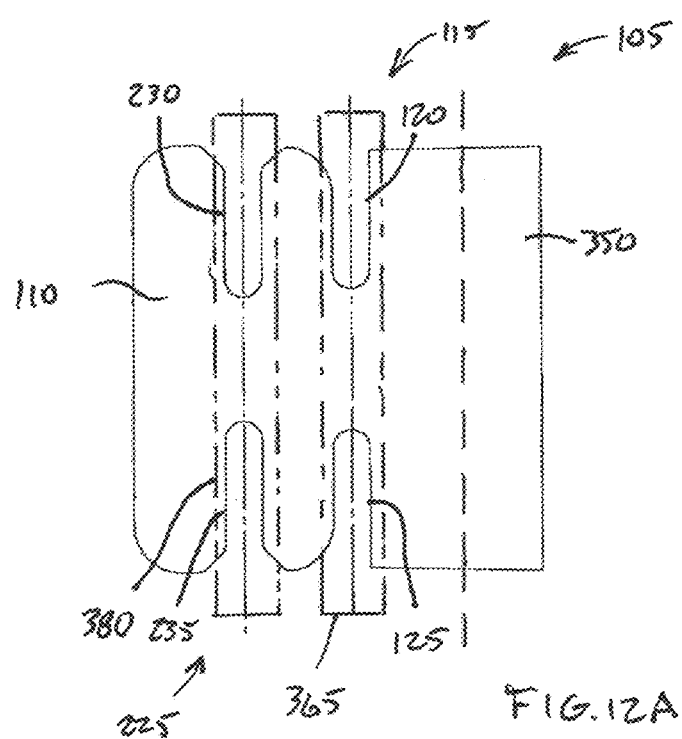
FIG. 12A is a schematic side view of a locking work piece of the binding system of FIG. 10A.
Figure 12B:
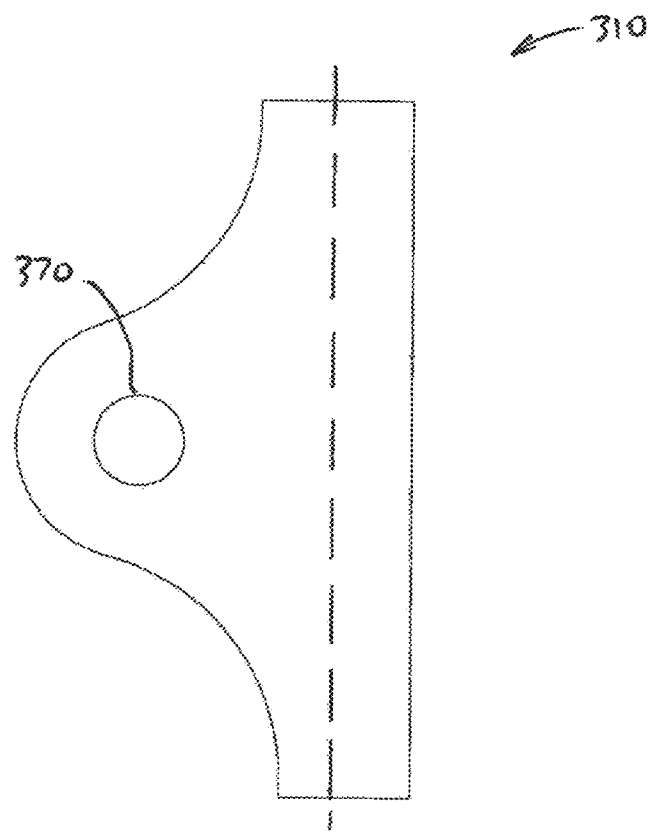
FIG. 12B is a schematic side view of a fixing plate of the binding system of FIG. 10A.

FIG. 12A shows the locking work piece 105 in plan view. As shown, the locking work piece 105 has a pair of channels 115 in the form of opposing first channel 120 and second channel 125. Phantom box 365 shows the channels being in line and opposed. However, as discussed above, the channels can be differently oriented. FIG. 12B shows the fixing plate 310 which has an eyelet 370 into which the first portion 190 of the elastomeric cord 135 can be passed and clamped by claim 375 as shown in FIGS. 10A and 10B. Alternatively, the elastomeric cord 135 can be attached to the fixing plate 310 by any other attachment.

Referring back to FIG. 10A, the first portion 190 of the elastomeric cord 135 is connected to the fixing plate 310 and then the second portion 195 of the elastomeric cord 135 is extended to wrap around the popliteal area of the wearer around the back of the knee. The third portion 200 is drawn into tension and while in the stretched condition is further compressed to reduce its diameter so it can be inserted into the first channel 120. The fourth compressed portion 205 is stretched to pass through the second channel 125, as discussed above. The locking work piece 105 can have a second pair of channels 225 including channel 230 and channel 235, as discussed above and as shown by second phantom box 380 in FIG. 12A.

Figure 13:
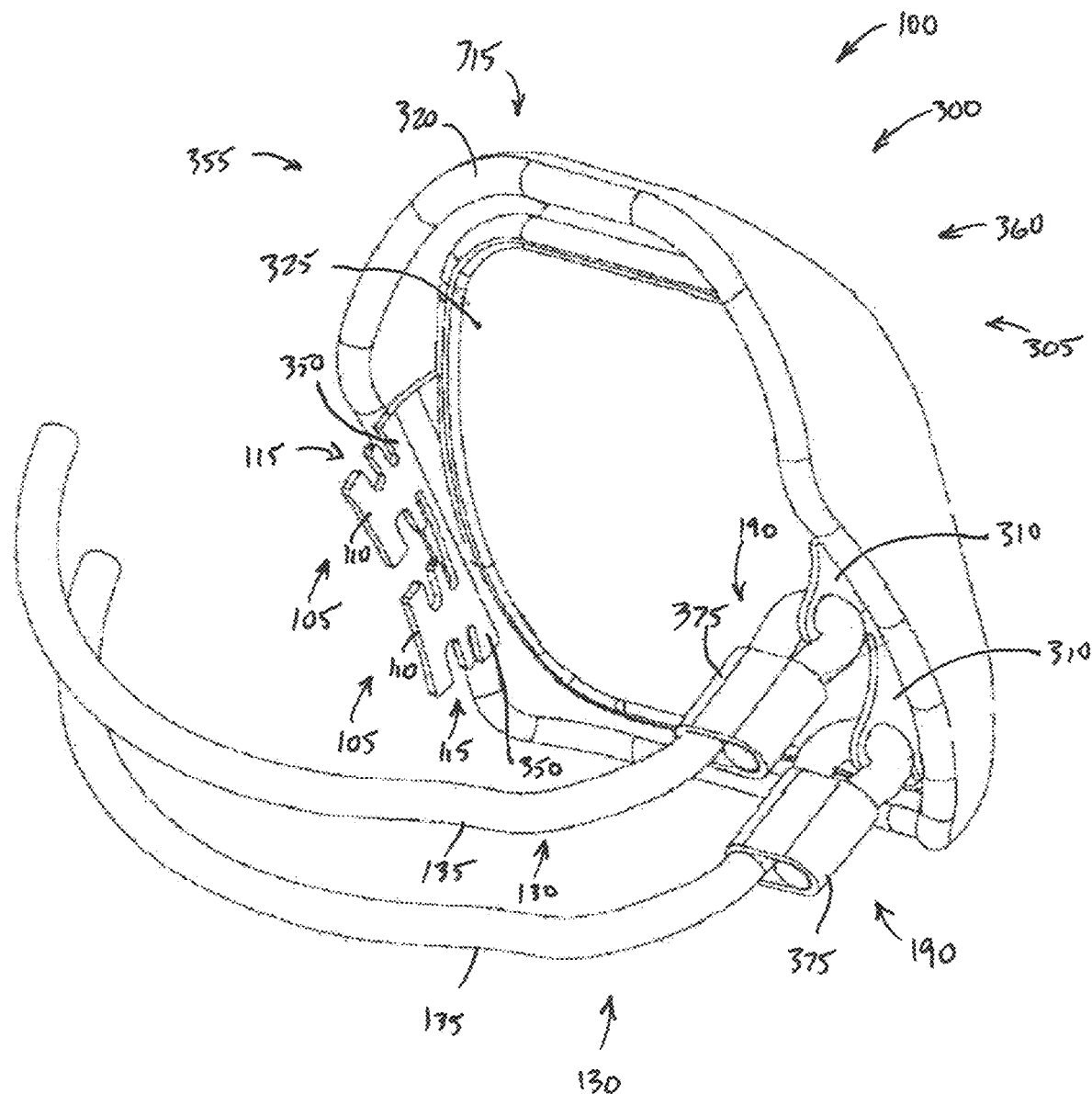
FIG. 13 is a schematic perspective view of another version of a binding system of the invention.

FIG. 13 shows a left knee pad as characterized above. However, in the version of FIG. 13 a plurality of locking work pieces 105, fixing plates 310, and elastomeric cords 135 are provided. The additional locking work piece 105 and fixing plate are coupled to the body 320 in the same way as above, but are displaced on the rear edge left side so as to uniformly distribute the holding force from the elastomeric cords 135. This provides the option of reducing the tension of the elastomeric cords 135 and improving the comfort afforded to the wearer.

Figure 14A:
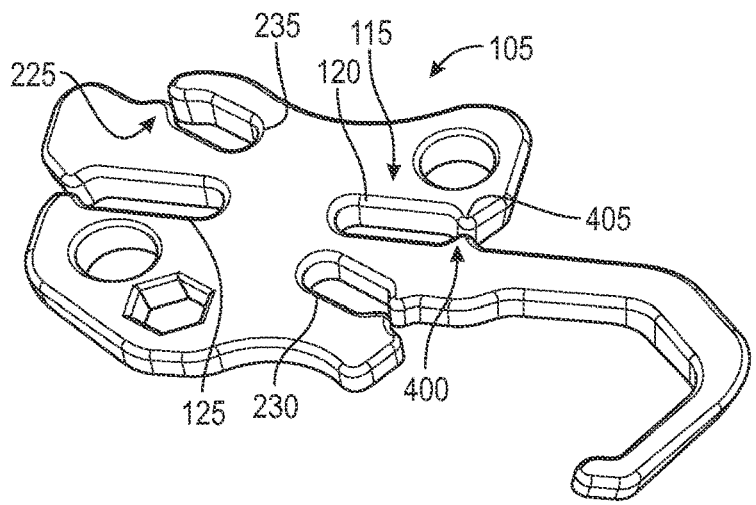
FIG. 14A is a schematic perspective top view of a version of a locking work piece for a binding system of the invention.
Figure 14B:
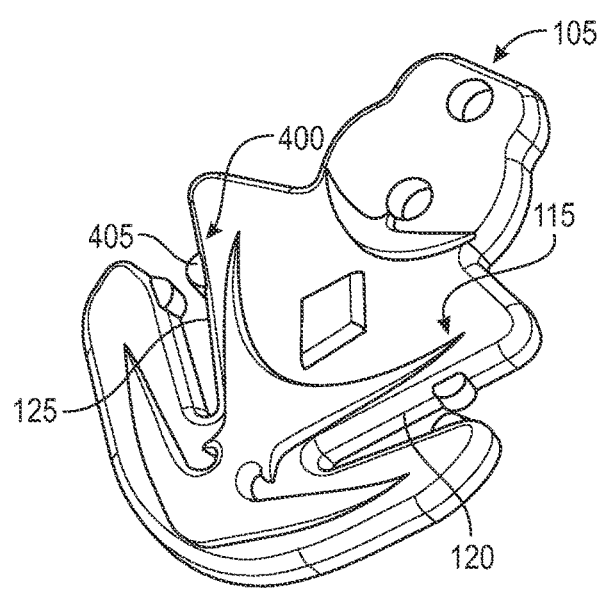
FIG. 14B is a schematic perspective top view of another version of a locking work piece for a binding system of the invention.
Figure 14C:
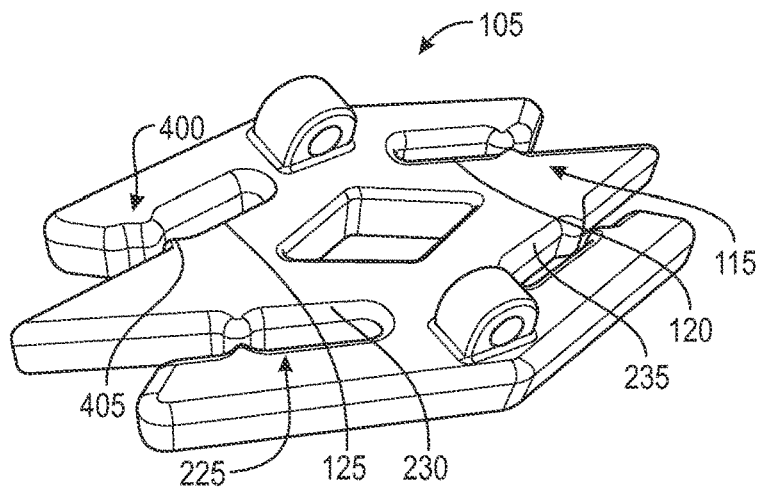
FIG. 14C is a schematic perspective top view of another version of a locking work piece for a binding system of the invention

Alternative versions of locking work pieces 105 that may be used with any of the above discussed binding systems 100 are shown in FIGS. 14A, 14B, and 14C. In each of these versions, the channels include a channel securing member 400 at or near the opening of each channel. The channel securing member 400 can include one or a pair of protrusions 405 that extending into the channel and help prevent a compressed elastomeric cord 135 from sliding out of the channel. In addition, each of FIGS. 14A, 14B, and 14C illustrate alternative channel orientations for the first pair of channels 115 and/or the second pair of channels 225. These and all other versions of the locking work piece 105 can be used in the manners described above and/or in any other manner and on their own. For example, the locking work pieces can be used as a hair clip.

In addition to the uses all ready mentioned, it should be understood that the locking work piece 105 can be made of plastic such as ABS, metal fiber glass, carbon fiber or from a combination of the materials mentioned above. The elastomeric cord 135 can formed from cylindrical, rectangular, or solid elastomeric material or from the same material that bungee cords are made. The elastomeric cord 135 can have a cross sectional shape other than a circle. A flat elastomer could be used to make the elastomeric cord. Rope or fabric could be used to make an equivalent, albeit non elastic version of the elastomeric cord 135.

Although the present invention has been described in considerable detail with regard to certain preferred versions thereof, other versions are possible, and alterations, permutations and equivalents of the version shown will become apparent to those skilled in the art upon a reading of the specification and study of the drawings. For example, the cooperating components may be reversed or provided in additional or fewer number, and all directional limitations, such as up and down and the like, can be switched, reversed, or changed as long as doing so is not prohibited by the language herein with regard to a particular version of the invention. Also, the various features of the versions herein can be combined in various ways to provide additional versions of the present invention. Furthermore, certain terminology has been used for the purposes of descriptive clarity, and not to limit the present invention. Throughout this specification and any claims appended hereto, unless the context makes it clear otherwise, the term "comprise" and its variations such as "comprises" and "comprising" should be understood to imply the inclusion of a stated element, limitation, or step but not the exclusion of any other elements, limitations, or steps. Throughout this specification and any claims appended hereto, unless the context makes it clear otherwise, the term "consisting of" and "consisting essentially of" and their variations such as "consists" should be understood to imply the inclusion of a stated element, limitation, or step and not the exclusion of any other elements, limitations, or steps or any other non-essential elements, limitations, or steps, respectively. Throughout the specification, any discussed on a combination of elements, limitations, or steps should be understood to include a disclosure of additional elements, limitations, or steps and the disclosure of the exclusion of additional elements, limitations, or steps. All numerical values, unless otherwise made clear in the disclosure or prosecution, include either the exact value or approximations in the vicinity of the stated numerical values, such as for example about +/−ten percent or as would be recognized by a person or ordinary skill in the art in the disclosed context. The same is true for the use of the terms such as about, substantially, and the like. Also, for any numerical ranges given, unless otherwise made clear in the disclosure, during prosecution, or by being explicitly set forth in a claim, the ranges include either the exact range or approximations in the vicinity of the values at one or both of the ends of the range. When multiple ranges are provided, the disclosed ranges are intended to include any combinations of ends of the ranges with one another and including zero and infinity as possible ends of the ranges. Therefore, any appended or later filed claims should not be limited to the description of the preferred versions contained herein and should include all such alterations, permutations, and equivalents as fall within the true spirit and scope of the present invention.

What is claimed is:

1. A binding system for attaching a first object to a second object, the first object having a supporting structure, the binding system comprising:
   a fixing plate connected to the supporting structure at a first side of the first object;
   a locking work piece connected to the supporting structure at a second side of the first object, the locking work piece comprising a first channel and a second channel, the first channel having a channel opening on a first side of the locking work piece, the second channel having a channel opening at an opposite side of the locking work piece; and
   an elastomeric cord having a first end and a second end, the first end coupled to the fixing plate, the elastomeric cord having a first cross-sectional dimension when in an unstretched condition,
   wherein the first channel has a width that is less than the first cross-sectional dimension of the elastomer cord, wherein the elastomeric cord may be guided around the second object so that the second end can be connected to the locking work piece by stretching the elastomer cord to reduce the cross-sectional dimension of the elastomer cord to a size smaller than the width of the first channel, inserted into the first channel, and unstretched so that the elastomer cord is retained within the first channel, and
   wherein the second channel has a width that is less than the first cross-sectional dimension of the elastomer cord, wherein the second end of the elastomer cord that is retained within the first channel can be further stretched to reduce the cross-sectional dimension of the elastomer cord to a size smaller than the width of the second channel, inserted into the second channel, and unstretched so that the elastomer cord is retained within the second channel.

2. A binding system according to claim 1 wherein the first object is a knee pad.

3. A binding system according to claim 1 wherein the elastomer cord has a round cross-section.

4. A binding system according to claim 1 wherein the elastomer cord has a circular cross-section.

5. A binding system according to claim 1 wherein the first object is a knee pad.

6. A binding system according to claim 1 wherein the first channel and the second channel are opposing channels.

7. A binding system according to claim 1 wherein the first channel and the second channel are opposing channels and lie along the same axis.

8. A binding system according to claim 1 wherein the first end of the elastomer cord is coupled to the fixing plate through an eyelet in the fixing plate.

9. A binding system according to claim 1 wherein the locking work piece comprises a third channel and a fourth channel.

10. A binding system for bundling a plurality of objects, the binding system comprising:
    a locking work piece comprising a first channel and a second channel, the first channel having a channel opening on a first side of the locking work piece, the second channel having a channel opening at an opposite side of the locking work piece; and
    an elastomeric cord having a first end and a second end and a length between the first end and second end sufficiently long to wrap around and bundle the plurality of objects, the first end coupled to the locking work piece, the elastomeric cord having a first cross-sectional dimension when in an unstretched condition,
    wherein the first channel has a width that is less than the first cross-sectional dimension of the elastomer cord, wherein the elastomer cord may be guided around the second object so that the second end can be connected to the locking work piece by stretching the elastomer cord to reduce the cross-sectional dimension of the elastomer cord to a size smaller than the width of the first channel, inserted into the first channel, and unstretched so that the elastomer cord is retained within the first channel,
    wherein the second channel has a width that is less than the first cross-sectional dimension of the elastomer cord, wherein the second end of the elastomer cord that is retained within the first channel can be further stretched to reduce the cross-sectional dimension of the elastomer cord to a size smaller than the width of the second channel, inserted into the second channel, and unstretched so that the elastomer cord is retained within the second channel, and
    wherein the first channel and the second channel are opposing channels and lie along the same axis.

11. A binding system according to claim 1 wherein the first end of the elastomer cord is coupled to the locking work piece through an eyelet in the fixing plate.

12. A binding system for bundling a plurality of objects, the binding system comprising:
    a locking work piece comprising a first channel and a second channel, the first channel having a channel opening on a first side of the locking work piece, the second channel having a channel opening at an opposite side of the locking work piece; and
    an elastomeric cord having a first end and a second end and a length between the first end and second end sufficiently long to wrap around and bundle the plurality of objects, the first end coupled to the locking work piece, the elastomeric cord having a first cross-sectional dimension when in an unstretched condition,
    wherein the first channel has a width that is less than the first cross-sectional dimension of the elastomer cord, wherein the elastomeric cord may be guided around the second object so that the second end can be connected to the locking work piece by stretching the elastomer cord to reduce the cross-sectional dimension of the elastomer cord to a size smaller than the width of the first channel, inserted into the first channel, and unstretched so that the elastomer cord is retained within the first channel,
    wherein the second channel has a width that is less than the first cross-sectional dimension of the elastomer cord, wherein the second end of the elastomer cord that is retained within the first channel can be further stretched to reduce the cross-sectional dimension of the elastomer cord to a size smaller than the width of the second channel, inserted into the second channel, and unstretched so that the elastomer cord is retained within the second channel, and
    wherein the locking work piece comprises a third channel and a fourth channel.

13. A binding system according to claim 1 wherein the first channel and second channel each comprise a channel securing member comprising one or more protrusions that extend into channels.

14. A binding system according to claim 10 wherein the first channel and second channel each comprise a channel securing member comprising one or more protrusions that extend into channels.

15. A binding system according to claim 12 wherein the first channel and second channel each comprise a channel securing member comprising one or more protrusions that extend into channels.

* * * * *